April 21, 1970    N. ANTON ET AL    3,508,046
RANGE MEASURING APPARATUS USING RADIOACTIVE MATERIAL
Filed July 15, 1964    2 Sheets-Sheet 1

INVENTORS
NICHOLAS ANTON
MYRON YOUDIN
BY
Darby & Darby
ATTORNEYS

United States Patent Office 3,508,046
Patented Apr. 21, 1970

3,508,046
RANGE MEASURING APPARATUS USING
RADIOACTIVE MATERIAL
Nicholas Anton, Brooklyn, and Myron Youdin, Flushing, N.Y., assignors to Eon Corporation, Brooklyn, N.Y., a corporation of New York
Filed July 15, 1964, Ser. No. 382,762
Int. Cl. G01n 23/12
U.S. Cl. 250—43.5          8 Claims

ABSTRACT OF THE DISCLOSURE

This invention relates to altitude or range measuring instruments and more particularly to an instrument for measuring altitude or range by the use of radioactive materials.

There are many situations where it is necessary to precisely measure altitudes or distances and more particularly relatively small altitudes or distances. Typical examples of such instances would be where an aircraft is close to a runway and is making an instrument landing (blind) flying approach; where a vertical takeoff (VTOL) or other similar type of aircraft is nesting or making a transition from level to vertical flight; where an air cushion type of hovering vehicle is to be kept at a predetermined height; where a space vehicle is approaching the surface of the earth or other planet and is using its braking rockets to control a landing approach; and where two space vehicles are "docking" in space, i.e. the two vehicles are coming together to link up.

As is known, there are many types of instruments and equipment for measuring altitude and/or range. Typical are those which use barometric pressure, radio waves, radar, etc. All of these various types of instruments have disadvantages which render them unsuitable for accurate measurement of range in certain applications, particularly where only small distances in the order of around one hundred feet or less are to be measured. For example, the use of radio frequency energy involves the use of relatively long radio waves and therefore the desired degree of accuracy cannot be obtained. Similarly, when radar is utilized it is difficult to measure close range in view of ground "clutter" which is introduced in the radar receiver. Barometric instruments are notoriously inaccurate and, of course, they are not suitable for use in space, where there is no air pressure.

In the copending application of Robley D. Evans, entitled "Range Measuring Apparatus Using Radioactive Material," Ser. No. 344,886, filed Feb. 14, 1964, and assigned to the assignee of the present invention, now abandoned, a system is described using radioactive material and radioactive counters to precisely measure relatively small altitudes or ranges between two vehicles or between a vehicle and another object, such as the surface of the earth or other planet. In accordance with the preferred embodiment of the Evans invention, the vehicle which is to make the range or altitude measurement is provided with a source of radioactive material and two radiation detectors and counters which are spaced a predetermined distance apart on the vehicle. The detectors respectively measure the radioactive energy reflected from the other vehicle or object. By taking the counting rate of each of the detectors and knowing their distance of separation and the absorption coefficient of the medium in which the vehicle is operating, the distance of the vehicle from the object or other vehicle is readily determined by solving a simple equation.

It has been determined that in certain circumstances the accuracy of the range measurement will be affected by material from the object which has been transported into the path of the reflected radioactive energy before it reaches the detectors on the vehicle. In accordance with the present invention this is taken care of by providing a third detector which is also responsive to the reflected radioactive energy. By using this third detector in a predetermined manner, an accurate range measurement can be obtained even if the absorption coefficient of the medium (material) transported into the path of the reflected radioactive energy is unknown.

The present invention also provides the capability of measuring the rate of closure between the vehicle and the object, or other vehicle, from the range measurement information available. This is highly advantageous since it provides a capability of measuring the closure rates of two bodies originally spaced a small distance apart.

It is therefore an object of this invention to provide a system utilizing radioactive energy which is extremely accurate for measuring small distances.

A further object of the invention is to provide a low level range or altimeter system in which distance is measured by using the respective counting rates of a plurality of radiation detectors mounted a predetermined distance apart.

Still a further object of the invention is to provide a system for measuring small distances by measuring on a plurality of detectors the counting rates of radioactive energy reflected from an object to which distance is to be measured and to provide an additional detector to compensate for the presence of material of an unknown character in the path of the reflected energy.

A further object of the invention is to provide a system using radioactive energy for measuring the rate of closure between two bodies.

Another object of the invention is to provide a distance measuring system for a vehicle, the system operating by transmitting radioactive energy from the vehicle to an object and measuring the ratio of the counting rates of reflected radioactive energy received by a plurality of detectors mounted in spaced relationship on the vehicle.

Other objects and advantages of the present invention will become more apparent upon reference to the following specification and annexed drawings in which.

Figure 1:
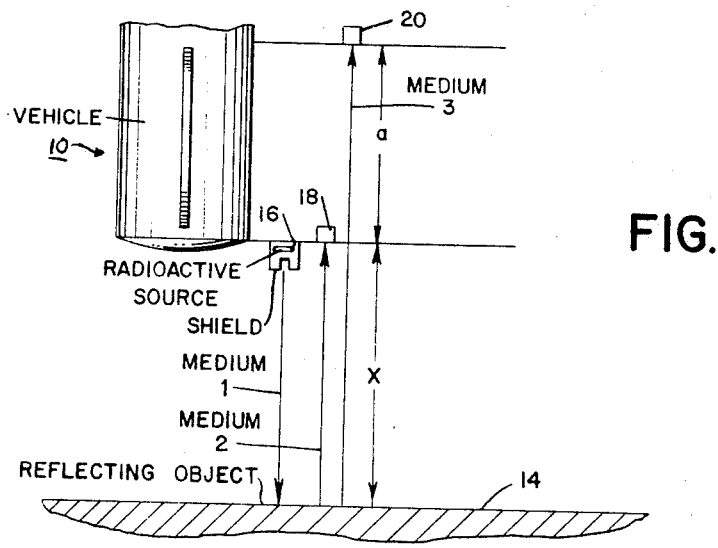
FIGURE 1 is a sketch illustrating certain principles of the invention.

Referring first to FIGURE 1, the present invention is shown mounted on a vehicle 10 which is at a distance above the face of an object 14 on which the vehicle is to land, or otherwise make contact, or maintain a predetermined distance relationship thereto. The vehicle 10 may therefore be considered as either ascending, descending or in a horizontal attitude. Also, both the vehicle and the object may be considered to be turned from the positions shown since the system will also operate no matter what planes both the vehicle or object are in. The vehicle 10 may be any suitable type such as an aircraft, hovercraft or a rocket and the object 14 may be any suitable object such as the surface of the earth, the surface or other planets, or the surface of another aircraft or rocket.

The vehicle 10 carries a source of radioactive material 16 which is preferably shielded so that the radioactive particles or photons are directed downwardly towards the surface of the object 14 and essentially none escape either towards the side or above the source 16. Stated another way, the energy from source 16 is well collimated so that the size of the beam impinging on object 14 does not vary to any great extent as the distance between the two objects changes. Source 16 is located either in the body of the vehicle or extended slightly outward therefrom. Source 16 is preferably a material which emits gamma rays when the system is operating in air or any other medium that has a substantial density. A source which emits beta particles is preferably used when the system is operating in a vacuum or other low density medium. The preferred embodiment of the invention will be described as using gamma rays although it should be understood that any suitable type of radioactive energy may be used. Many suitable radioactive materials are available for this purpose.

Also on the vehicle 10 are first and second radiation detectors 18 and 20. These detectors measure the amount of radioactive energy reflected back from the surface of object 14. This reflected energy originates from source 16. The first detector 18 is shown a distance $x$ above the surface of the object 14 and is preferably located along the same horizontal axis as the source 16. Of course, the first detector can be located either above or below the axis of the source since the difference in distance between detector 18 and source 16 can be accounted for in solving the distance measuring equation.

The second detector 20 is spaced an additional distance $a$ above the first detector 18. Both detectors 18 and 20 may be of any suitable type, for example, halogen quenched geiger counters, proportional counters, solid state gamma ray detector counters, ionization chambers, scintillation counters, etc. All of these types of detectors are well known in the art and no further description thereof is necessary. It should be pointed out that the counting type of detectors, such as a geiger counter, produce a rate or event per unit time output while the ionization chamber produces an output current which is usually converted to a voltage across a suitable resistor.

Both detectors 18 and 20 may be of the same type or else two different types may be used where different detector efficiencies are needed. This is explained below. As should be obvious, since the intensity of reflected radioactive energy varies inversely with the square of the distance, the voltage output or count of detector 20 will be less than the voltage output or count of detector 18 since detector 20 is further above the surface of the object 14.

As can be seen from FIGURE 1, the radioactive source 16 and the first detector 18 are mounted at or near the end of the vehicle 10 which is to approach the other vehicle or object. It is desired that the altimeter or range system of the present invention measure the range or altitude between this end of the vehicle and the surface of the object 14. If it is considered that the source 16 and first detector 18 are mounted at the end of the vehicle, then the distance to be solved for is $x$. Any spacing of the detector from the source or of the detector and source from the end of the vehicle are constant quantities and can be readily compensated for in solving the distance equation.

The radioactive gamma energy emitted by source 16 goes through medium 1 on its way to the surface of the object 14. Similarly, the gamma energy reflected from the surface of the object 14 goes through the same medium, now designated medium 2, on its way to the first detector 18. The gamma energy reflected from the surface of the object 14 also passes by the first detector 18 and goes to the second detector 20 through a medium 3. This medium may be the same or different from media 1 and 2. Medium 3 would be different, for example, where the vehicle produced a large quantity of "dust" or other particles blown up from the object 14 in the path of detector 20.

The gamma energy counting rate $N_1$ at the first detector 18 is given by:

$$(1) \quad N_1 = B_1 + k \cdot \frac{I_0 \epsilon^{-\mu_1 x}}{x^2} \cdot \frac{R \epsilon^{-\mu_2 x}}{x^2} \cdot e_1$$

while the gamma particle counting rate $N_2$ at the second detector 20 is given by:

$$(2) \quad N_2 + B_2 + k \cdot \frac{I_0 \epsilon^{-\mu_1 x}}{x^2} \cdot \frac{R \epsilon^{-\mu_2 x} \cdot \epsilon^{-\mu_3 a}}{(x+a)^2} \cdot e_2$$

$I_0$ = radioactive source 16 strength.
$R$ = reflectivity of surface of object 14 to gamma rays.
$B_1$ = background radiation measured at detector 18.
$B_2$ = background radiation measured at detector 20.
$e_1$ = efficiency of detector 18.
$e_2$ = efficiency of detector 20.
$\mu_1$ = linear coefficient of absorption for gamma in medium 1.
$\mu_2$ = linear coefficient of absorption for gamma in medium 2.
$\mu_3$ = linear coefficient of absorption for gamma in medium 3.
$k$ = constant of proportionality.

When the source 16 is well shielded and collimated so that $B_1$ and $B_2$, the background radiation, are very small as compared with the reflected radiation then:

$$(3) \quad \frac{N_1}{N_2} = \frac{e_1}{e_2} \cdot \frac{1}{\epsilon^{-\mu_3 a}} \cdot \left(\frac{a}{x} + 1\right)^2$$

Assuming first that medium 3 is a vacuum so that $\mu_3 = 0$, then:

$$(4) \quad \frac{N_1}{N_2} = \frac{e_1}{e_2} \cdot \left(\frac{a}{x} + 1\right)^2$$

By using the same type of detectors 18 and 20 so that $$\frac{e_1}{e_2} = 1$$

Equation 4 may now be rewritten as:

$$(5) \quad \frac{N_1}{N_2} = \left(\frac{a}{x} + 1\right)^2$$

Since both counting rates $N_1$ and $N_2$ are determined from the detectors 18 and 20 and since $a$ is known, it is a simple matter to solve for $x$, i.e.

$$(6) \quad x = \frac{a}{\sqrt{\frac{N_1}{N_2}} - 1}$$

Figure 2:
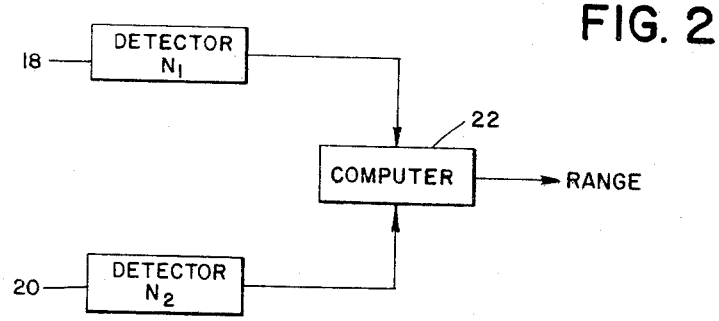
FIGURE 2 is a block diagram of the system using a computer to solve for range.

FIGURE 2 shows a block diagram of a circuit for solving Equation 6. Here, the outputs of the two detectors 18 and 20 are applied to the input of a computer 22 which is programmed to solve (6). If the detectors 18 and 20 produce output counts, then the computer may be of the digital type. Where the output of the detectors is a voltage or current, or the counts are converted into a voltage or current, an analog type computer is preferably used. Suitable digital and analog computers are conventional in the art and have the capability of solving equations as relatively simple as (6). Thus, no further description of these computers is necessary.

It should be clear that in Equation 6 the quantity $a$ is normally constant. Thus, using (6) a chart also can be compiled which tabulates the distance $x$ in feet, solely as a function of $N_1/N_2$, for a fixed distance $a$ in feet. Assuming as typical examples that $a=20$ feet, $a=15$ feet, and $a=10$ feet, then the following relationships would apply:

| $x$ (ft.) | $\frac{N_1(a=20')}{N_2}$ | $\frac{N_1(a=15')}{N_2}$ | $\frac{N_1(a=10')}{N_2}$ |
|---|---|---|---|
| 50 | 1.96 | 1.69 | 1.44 |
| 45 | 2.09 | 1.78 | 1.50 |
| 40 | 2.25 | 1.89 | 1.56 |
| 35 | 2.48 | 2.04 | 1.65 |
| 30 | 2.78 | 2.25 | 1.78 |
| 20 | 4 | 3.06 | 2.25 |
| 10 | 9 | 6.25 | 4 |
| 5 | 25 | 16 | 9 |
| 4 | 36 | 23 | 12 |
| 3 | 59 | 36 | 19 |
| 2 | 121 | 72 | 36 |
| 1 | 441 | 256 | 121 |

Of course, similar charts may be constructed for other distances $a$.

Figure 3:
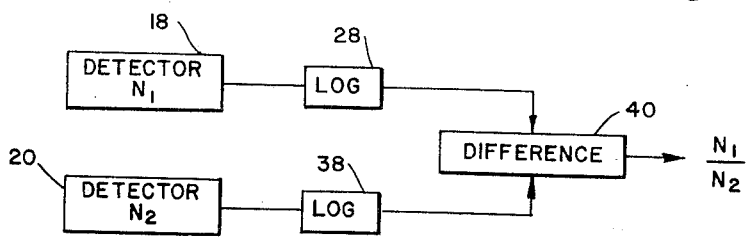
FIGURE 3 is a schematic diagram showing a portion of the measuring system.

FIGURE 3 shows an arrangement for obtaining the ratio $N_1/N_2$ so that Chart 1 may be used. Here the outputs of detectors 18 and 20, which are either voltages or events per unit time converted into voltages by conventional averaging techniques, are applied to the respective logarithmic circuits 28 and 38 which form the logarithms of the detector outputs. The circuits 28 and 38 are, for example, conventional logarithmic amplifiers and their outputs are connected to a difference circuit 40 whose output is a voltage representative of the ratio $N_1/N_2$. This is true because subtracting logarithms is the equivalent of dividing. The output of the difference circuit 40 may be used to drive a suitable meter which is calibrated in accordance with Chart 1 for the particular value of $a$. As should be realized, it is also possible to make the detectors 18 and 20 operate in a logarithmic manner, i.e. to have logarithmically calibrated outputs. Then, it is only necessary to subtract the two detector outputs to obtain the ratio $N_1/N_2$.

Where the event per unit time (detector count) output is not to be converted into a voltage, then each of the detector outputs can be used to drive a counter such as an EPUT (event per unit time) meter. The counts of the two meters can then be divided to get the counting ratio for use with Chart I.

As discussed previously with reference to Equation 3 the factor $\mu_3$ of medium 3 enters into the final calculation of the distance $x$. Where the medium 3 and $\mu_3$ are known, it presents no problem since it is then only necessary to adjust the efficiencies $e_1$ and $e_2$ of the detectors or their calibrations so that $\mu_3$ and $e_1$ and $e_2$ cancel out to give Equation 5. This is a relatively simple matter and only requires the insertion of suitable shields or filters, recalibration of the detectors, and/or use of two different types of detectors.

Figure 4:
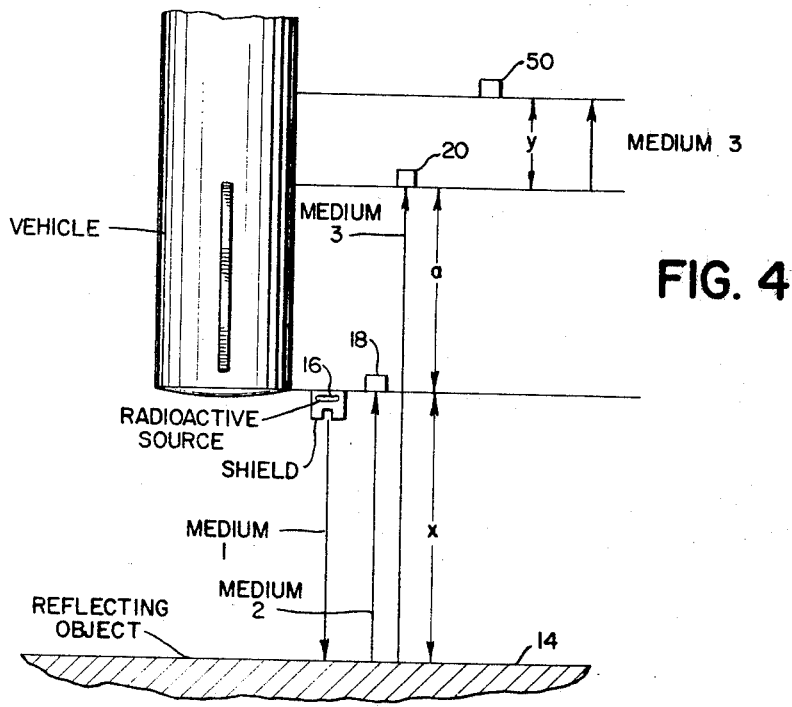
FIGURE 4 is a further sketch illustrating the use of a three detector system to cancel out the effect of unknown material being transported into the path of each of the detectors.

It should be understood that the real relevancy of $\mu_3$ enters into the picture when medium 3 is unknown. Where medium 3 is composed of a substance which has low absorption properties to gamma energy, such as the earth's atmosphere, the effect of $\mu_3$ being other than the coefficient of absorption for a vacuum will introduce only a relatively small error into the measurement of $x$ by Equation 5. Therefore, under many conditions $\mu_3$ may be ignored for all practical purposes. However, where $\mu_3$ is unknown and does cause absorption of a considerable amount of gamma energy, which would affect the count of detector 20, steps must be taken to eliminate this source of error. This can be done in several ways. First of all, the area between the surface of object 14 and the detector 20 can be made free and clean of any material which would give rise to the $\mu_3$ error. This is accomplished by providing suitable screens or shields to keep the material out of the path of detector 20, providing an air or gas source to blow the material out of the way, etc. Where this approach cannot be used, a third detector 50 can be mounted on the vehicle a known distance $y$ above the second detector 20. This is shown in FIGURE 4. The output $N_3$ from the third detector would be:

$$(7) \quad N_3 = B_3 + k \frac{I_0 \epsilon^{-\mu_1 x}}{x} \cdot \frac{R \epsilon^{-\mu_3 y} \cdot \epsilon^{\mu_2 x} \cdot \epsilon^{-\mu_{3a}}}{(x+a+y)^2} \cdot e_3$$

where $B_3$ is the background radiation measured at detector 50 and $e_3$ is the efficiency of detector 50. The $N_3$ detector output can be processed with the outputs $N_1$ and $N_2$ of detectors 18 and 20 as given by Equations 1 and 2 to get $x$. Equations 1, 2 and 7 can then be solved for $x$ since both $a$ and $y$ are known. The result of this solution will be independent of $\mu_3$.

The solution for $x$ from Equations 1, 2 and 7 may be accomplished in any desired manner. For example, assuming again that the background radiation $B_3$ is very small and can be neglected and that detectors 18, 20 and 50 are of the same type so that their efficiencies are the same, these ratios $N_1/N_2$, $N_1/N_3$ and $N_2/N_3$ may be obtained and $x$ solved from these ratios since the $\mu_3$ factors will cancel and only $x$ is unknown. This solution, and any other solution for finding one unknown in a three equation set, can be accomplished by any suitable analog or digital computer with the proper program. Since the construction and use of such computers and their programming are conventional in the art and, in themselves, do not form the present invention, no further description thereof is deemed necessary.

Figure 5:
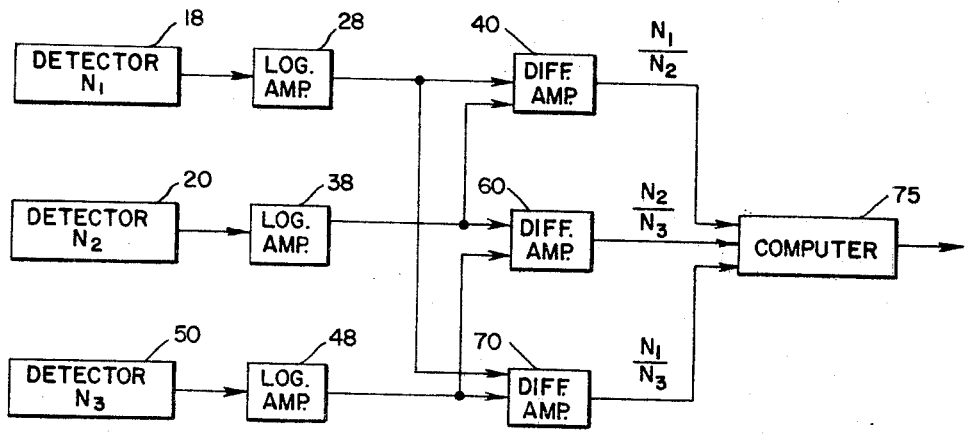
FIGURE 5 is a schematic block diagram of the invention.

FIGURE 5 shows a system similar to that of FIGURE 3 for finding the range with the three detector set-up. Here, the outputs of the detectors 18, 20 and 50 are applied to the inputs of the respective logarithmic amplifiers 28, 38 and 48. The output of logarithmic amplifiers 28 and 38 are applied to difference amplifier 40 to get the ratio $N_1/N_2$, the outputs of amplifiers 38 and 48 are applied to a difference amplifier 60 to get the ratio $N_2/N_3$, and the outputs of amplifiers 28 and 48 are applied to a difference amplifier 70 to get the ratio $N_1/N_3$. The three ratio output signals are applied to a conventional computer 75 which solves the range equation. If desired, the rate of closure may be obtained by the computer 75 by computing the rate of change of range.

It should be understood that in situations where the system is to be used where $\mu_3$ is one, that a suitable switching arrangement can be provided to disable the third detector 50 when it is not needed. In this case the circuits of FIGURES 2 and 3 would be used to determine range as previously described.

As seen from Equations 1 and 2 the counting rates $N_1$ and $N_2$ are both proportional to R, the gamma energy reflectivity coefficient. This coefficient determines the accuracy of the system since it relates to the actual point or depth at which back scatter (reflection) of the radioactive energy from source 16 takes place in the object 14 and hence affects both distances $a$ and $x$. If the object 14 is as dense as the surface of the earth then complete back-scatter of the energy from source 16 occurs in not more than a fraction of an inch. Even if the object 14 has a very low density, complete back-scatter occurs at a distance considerably less than one foot. Thus, the inherent error in the system is the distance into the object 14 at which reflection takes place. Reflection is always a maximum at the surface of an object since the intensity of the radioactive energy is a maximum there. As the radiation penetrates the surface of the object, absorption and inverse square effects reduce the intensity quickly.

As pointed out above, the inherent system measuring error where gamma rays are used is a function of the reflectivity coefficient R for gamma rays. Since beta particles do not penetrate as much as gamma rays, because the gamma rays have the inherent property of penetrating about 100 times further into a substance than beta particles, the effective error caused by R for measurements with gamma rays can be largely done away with by using beta particles and beta particle counters. Thus, for example, where the range measurement is to be carried out to a hard object 14 in a substantially vacuum-like surrounding where there is no effect on the measurement accuracy by $\mu_3$, the use of beta particles gives an extremely accurate result in the measurement of the distance $x$. Another use of the beta particles would be in an aircraft approaching a hard runway or deck of a ship. In both cases the beta particles would provide an extremely precise measurement of the intervening distance between the vehicle and the object. It should be understood that suitable sources of beta particles energy and beta detectors are commercially available. The system functions as other otherwise described with respect to measuring the ratio $N_1/N_2$ of the beta detectors. In situations where the system is working above water, neutrons could be profitably used.

It should also be understood that the present invention can be used to obtain the rate of closure of the vehicle 14 to the other object when one or both are moving with respect to each other. This can be done by obtaining the rate of change of the distance measured by solving Equation 6. Where a computer 22 is used to solve (6) directly as shown in FIGURE 2, the output is applied to a rate circuit 42, shown in dotted block form, to determine the rate of change of measured range. This gives the closure rate. Suitable rate taking circuits are conventional in the art and no detailed description thereof is believed necessary. For example, where the computer 22 is a digital computer, an additional program step is used to determine the rate of change of the digital output. Where the computer is of the analog type, a differentiating circuit is provided at the computer output. Both of these gives the rate of closure.

While preferred embodiments of the invention have been described above, it will be understood that these are illustrative only, and the invention is limited solely by the appended claims.

What is claimed is:
1. Apparatus for measuring range between first and second objects comprising on said first object:
   a source of radioactive material for emitting radioactive energy to impinge upon said second object, the impinging radioactive energy being reflected from the second object back to the first object and at least a portion of the reflected energy passing through a medium which causes an unknown amount of attenuation,
   first means on said first object for detecting the amount of radioactive energy reflected back from said second object,
   second and third means on said first object for detecting the amount of radioactive energy reflected from said second object, and passing through said medium with unknown attenuation,
   and means connected to said first, second and third detecting means for deriving the range between said first and second objects as a function of the amounts of radioactive energy detected at each of said first, second and third detectors with the effect of the unknown attenuation factor being eliminated.
2. Apparatus as set forth in claim 1 wherein said first, second and third detectors with the effect of the unknown attenuation factor being eliminated.

3. Apparatus as set forth in claim 2 and further comprising means connected to said range determining means for deriving the rate of change of range between the first and second object.
4. Apparatus for measuring the range $x$ between first and second objects comprising on said first object:
   a source of radioactive material for emitting radioactive energy to impinge upon said second object,
   first, second and third detecting means on said first object for detecting the quantity of radioactive energy reflected back from said second object in terms of respective counting rates $N_1$, $N_2$ and $N_3$, said first and second means being spaced by a predetermined distance $a$ and said first and third detecting means being spaced by a predetermined distance $a+y$,
   and means responsive to the counting rates of said detectors for determining the distance $x$.
5. Apparatus for measuring the range $x$ between first and second objects comprising on said first object:
   a source of radioactive material for emitting radioactive energy which impinges upon said second object,
   first, second and third detecting means on said first object for detecting the quantity of radioactive energy reflected back from said second object in terms of respective counting rates $N_1$, $N_2$ and $N_3$, at least a portion of said reflected energy passing through an unknown medium with an unknown attenuation factor,
   and fourth means connected to said first, second and third detecting means and responsive to the counting rates thereof for determining the distance $x$ between said first and second objects.
6. Apparatus as set forth in claim 5 and further comprising means connected to said fourth means for deriving the rate of change of range between said first and second objects.
7. Apparatus as set forth in claim 5 wherein said first and second means are separated by a first predetermined distance and said first and third means are separated by a second predetermined distance.
8. Apparatus for measuring the range between first and second objects comprising on said first object a source of radioactive material for emitting radioactive energy to impinge upon said second object, first and second means on said first object and spaced a predetermined distance apart for detecting the quantity of radioactive energy reflected back from said second object, means responsive to the quantity of reflected radioactive energy measured by said first and second detecting means for producing a signal corresponding to the range between said first and second object, and means also responsive to the quantity of reflected radioactive energy measured by said first and second detecting means for determining the rate of closure of said first and second objects.

References Cited

UNITED STATES PATENTS

| | | | |
|---|---|---|---|
| 2,206,036 | 7/1940 | Herson | 340—26 |
| 3,091,463 | 5/1963 | Cohen et al. | 250—71.5 X |
| 3,196,271 | 7/1965 | Wright | 250—43.5 X |
| 3,234,389 | 2/1966 | Boehm et al. | |

ARCHIE R. BORCHELT, Primary Examiner

U.S. Cl. X.R.

250—83.3; 340—26; 343—12